Aug. 11, 1925. 1,549,463
J. W. DIERDORF
HEAT TREATING FURNACE
Filed March 24, 1923 3 Sheets-Sheet 1

Inventor
J. W. Dierdorf
By Frease and Bond
Attorneys

Patented Aug. 11, 1925.

1,549,463

UNITED STATES PATENT OFFICE.

JOHN W. DIERDORF, OF CANTON, OHIO.

HEAT-TREATING FURNACE.

Application filed March 24, 1923. Serial No. 627,309.

*To all whom it may concern:*

Be it known that I, JOHN W. DIERDORF, a citizen of the United States, residing at Canton, in the county of Stark and State of Ohio, have invented certain new and useful Improvements in Heat-Treating Furnaces, of which the following is a specification.

This invention relates to heat treating furnaces of the type which are arranged to be tilted to discharge the contents of the furnace by gravity, after a heat treating operation.

In the heat treatment of steel or iron castings, forgings and the like, three steps are customarily required to produce the desired result in the metal. The castings or forgings are first placed in a furnace and brought to a temperature of 1500° F. to 1600° F. or upwards. The material may then be allowed to cool in the furnace, or may be drawn and air cooled.

After being cooled, the material is again placed in the furnace and again heated to 1500° F. or 1600° F. at which temperature it is removed from the furnace and quenched in water or oil. After the quenching operation, the material is again placed in the furnace and heated to a temperature of 600° F. to 1200° F. and again drawn and air cooled.

In order that all of the articles under treatment attain a uniform hardness, it is necessary to remove them all simultaneously from the furnace so that they may be uniformly cooled or quenched.

The objects of the present invention are to provide a tilting furnace for heat treating metal castings, forgings and the like, whereby the contents of the furnace may be quickly discharged by gravity into the open air for cooling or into a tank of oil or water for quenching.

The above and other objects are attained by providing a tilting furnace body provided with a heating chamber having a flat, normally horizontal bottom or hearth to receive the articles to be heat treated, whereby the tilting of the furnace body will discharge the contents by gravity into the air for cooling, or into a tank of water or oil for quenching.

A preferred embodiment of the invention is illustrated in the accompanying drawings, in which—

Figure 1:
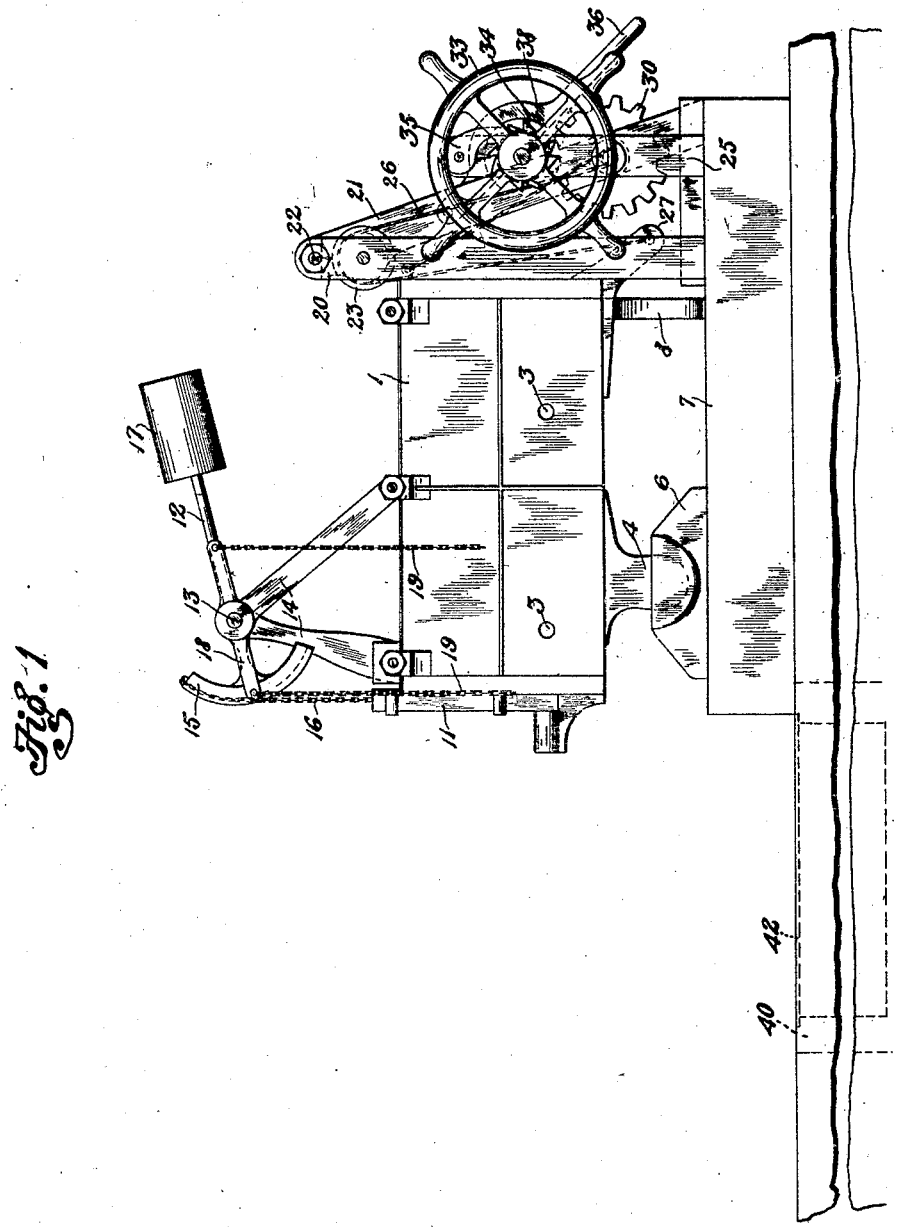
Figure 2:
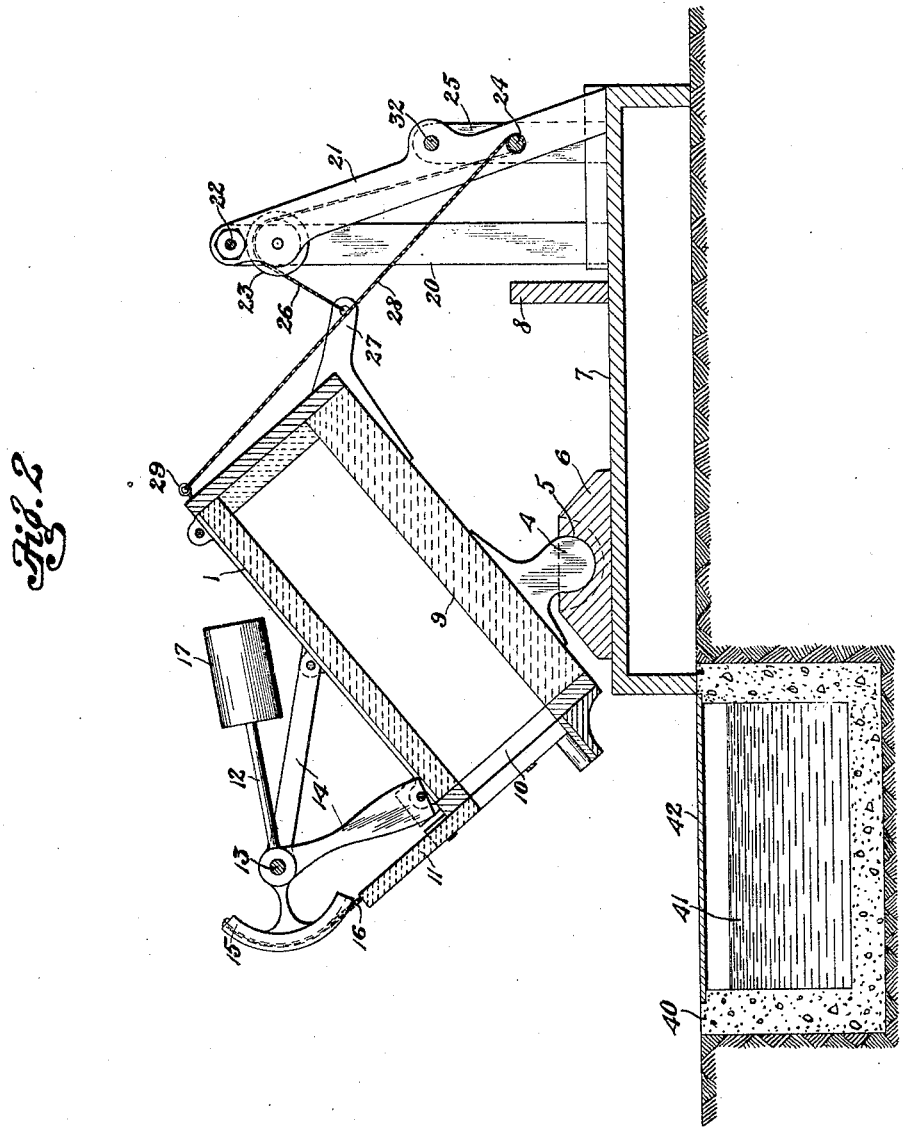

Figure 1 is a side elevation of the furnace in the normal position;

Fig. 2, a longitudinal sectional view through the same in tilted position; and

Figure 3:
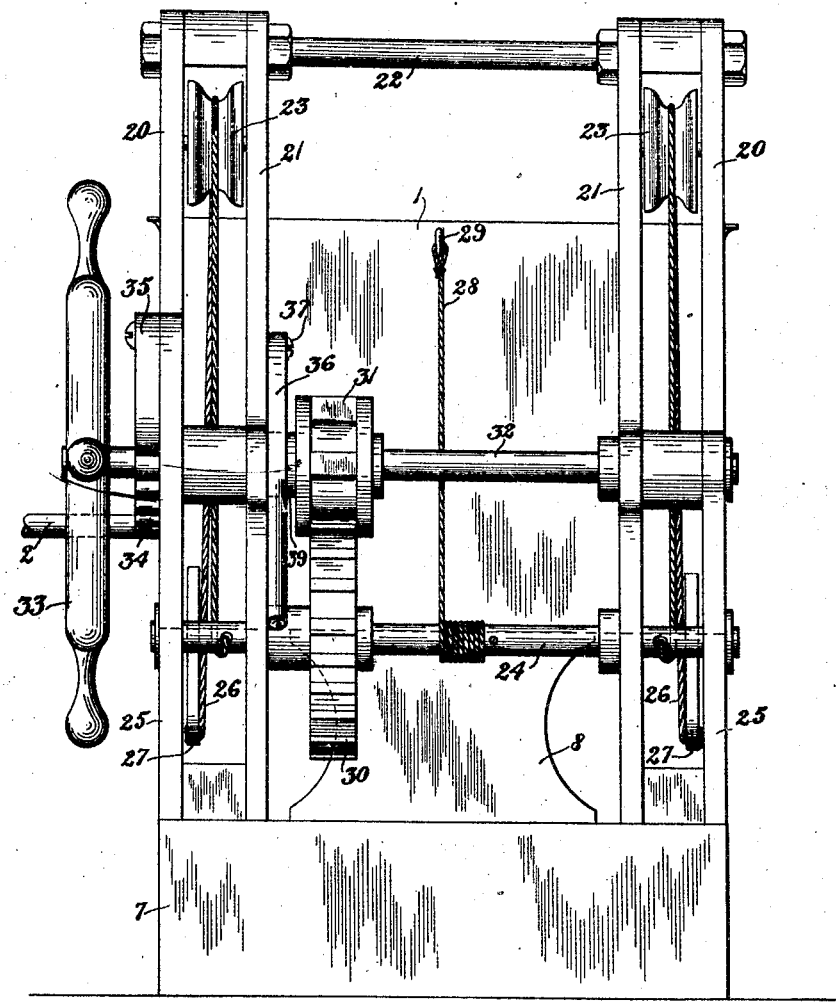

Fig. 3, an enlarged, rear, end elevation of the furnace;

Similar numerals of reference indicate corresponding parts throughout the drawings.

The furnace body 1 is illustrated as of the gas or oil heated type, although other means of heating the furnace may be provided. Gas or oil fuel burners as shown at 2 are located at the sides of the furnace so as to discharge into the inlet port holes 3 shown in the side walls of the furnace body. As these burners are spaced free from the sides of the furnace body, the same may be tilted to and from operative position, without requiring any change in the position of the burners.

A rounded knuckle 4 is mounted upon the under side of the furnace body near the forward end thereof and is journaled in the socket 5 formed in the block 6 which is mounted upon the base 7. An upright support 8 is fixed upon the base in position to support the rear end of the furnace body when the same is in the normal or horizontal position, as shown in Fig. 1.

The heating chamber of the furnace is provided with the flat, normally horizontal bottom 9, to receive the articles to be heat treated, and at an end of the heating chamber is located the door opening 10, which is normally closed by the sliding door 11. A lever 12 is journaled intermediate its extremities as at 13 upon the bracket 14 which is mounted upon the top of the furnace body near the forward end thereof and segments 15 are fixed at the forward end of the lever 12, chains 16 connecting the upper edge of the door with said segments. A counter weight 17 is carried upon the rear end of the lever 12 to counterbalance the door.

An operating lever 18 is fixed upon one end of the pivotal shaft 13 of the lever and depending pull chains 19 are connected to opposite ends of the operating lever for the purpose of tilting the lever 12 to open or close the door.

A spaced pair of standards 20 is mounted upon the base 7 in rear of the furnace and a downwardly and rearwardly inclined supporting member 21 is spaced from the inner side of each standard 20. The upper ends of the members 20 and 21 are connected by the tie bar 22, and a pulley 23 is journaled between each standard 20 and the adjacent supporting member 21.

A drum or windlass 24 is journaled in the inclined supporting members 21 and the short uprights 25 which are spaced from the members 21 in the rear of the standards 20. Cables 26 are connected to the lugs 27 at the lower rear corner of the furnace body and pass upward over the pulleys 23 and down to the windlass 24, to which they are attached at points between the members 21 and the short standards 25. A cable 28 is connected to the eye 29 located at the center of the upper edge portion of the rear wall of the furnace body and passes directly downward to the windlass, being wound thereon in the reverse direction to the cables 26.

A gear 30 upon the windlass meshes with a shrouded pinion 31 upon the counter shaft 32, a hand wheel 33 being fixed upon said shaft for manually rotating the same. A ratchet 34 is also mounted upon the shaft 32 and arranged to be engaged by the gravity pawl 35.

A friction brake is provided for controlling the lowering of the furnace body to the normal position and comprises a lever 36 pivoted as at 37 upon one of the inclined supporting members 21 and provided with the half round socket 38 arranged to frictionally engage the hub 39 of the shrouded pinion 31, to prevent too rapid rotation of the shaft 32 and windlass 24 when the furnace is being returned to horizontal position.

A tank 40 is located directly in front of the furnace body and below the level of the base 7 upon which the furnace is mounted, and is adapted to contain oil or water as indicated at 41 for the purpose of quenching the castings or forgings in the heat treating of the same, and a wire or metal basket may be located within the tank for the purpose of easily removing all of the articles after they have been quenched.

A removable cover plate 42 is provided for the quenching tank to normally cover the same when it is necessary to tilt the furnace to dump the contents thereof into the open air for air cooling.

From the above, it will be seen that the furnace is adapted for dumping the entire contents into the open air or into the quenching tank, as desired, to obtain a uniform cooling or quenching of the entire contents of the furnace. The forward tilting of the furnace body and opening of the door to the heating chamber will cause the contents to be discharged by gravity from the flat bottom of the heating chamber which is inclined forwardly by the tilting of the furnace as shown in Fig. 2.

I claim:

1. A tilting furnace for heat treating metal castings and forgings comprising a body provided with a heating chamber having a flat bottom to receive the articles to be heat treated and provided with a door opening registering with said flat bottom and means for tilting the body forwardly to discharge the contents of the heating chamber by gravity.

2. A tilting furnace for heat treating metal castings and forgings comprising a body provided with a heating chamber having a flat bottom to receive the articles to be heat treated and a door opening at the forward end of the heating chamber registering with said flat bottom, a door normally closing said opening, means for opening the door and means for tilting the body forwardly to discharge the contents of the heating chamber by gravity.

3. A tilting furnace for heat treating metal castings and forgings comprising a body provided with a heating chamber having a flat bottom to receive the articles to be heat treated and provided with a door opening registering with said flat bottom, a quenching tank at the forward end of the furnace, and means for tilting the body forwardly to discharge the contents of the heating chamber by gravity into said quenching tank.

4. A tilting furnace for heat treating metal castings and forgings comprising a body provided with a heating chamber having a flat bottom to receive the articles to be heat treated, a quenching tank at the forward end of the furnace, a removable cover plate for the quenching tank and means for tilting the body forwardly to discharge the contents of the heating chamber by gravity into said quenching tank or upon said cover plate.

In testimony that I claim the above, I have hereunto subscribed my name.

JOHN W. DIERDORF.